Patented Apr. 20, 1937

2,077,488

UNITED STATES PATENT OFFICE 2,077,488

AZO PIGMENT DYES AND THEIR PRODUCTION

Arthur R. Murphy, Penns Grove, N. J., and Crayton K. Black, Wilmington, Del., assignors to E. I. du Pont de Nemours & Company, Wilmington, Del., a corporation of Delaware No Drawing. Application April 18, 1935, Serial No. 17,058

4 Claims. (Cl. 260—86)

A. This invention relates to a new azo pigment dye and to a process for preparing it. U. S. Patent 1,595,269 described dyestuffs of a particular class which are claimed therein to have satisfactory characteristics. The present invention concerns a dye of a similar type having superior characteristics.

B. It is an object of the invention to produce a new and valuable pigment dye of bright orange shade which is fast to light, and brighter, cleaner, and stronger than similar dyes of the prior art. Another object of the invention is to develop a process for making the dye in a technically and economically satisfactory manner. Other objects of the invention will be in part apparent and in part hereinafter more fully set forth.

C. The objects of the invention are accomplished, generally speaking, by diazotizing 3-nitro-4-amino-anisole and coupling it to aceto-acet-para-toluidide.

D. The invention will be described in the following example, which is illustrative and not limitative thereof, and in which the parts are by weight.

*Example*

16.8 parts of 3-nitro-4-amino-anisole were stirred with 120 parts of water, 8 parts of 100% hydrochloric acid were added, and the mixture was cooled to 5° C. by the addition of ice. The amine was diazotized in the usual manner by the addition of 6.9 parts of sodium nitrite.

21 parts of aceto-acet-para-toluidide were dissolved in 250 parts of water by the addition of 4.3 parts of sodium hydroxide. 20 parts of sodium acetate were added and the solution made slightly acid by the addition of 3.85 parts of 100% hydrochloric acid.

The two solutions were mixed by adding the diazo solution to the toluidide solution over a period of about thirty minutes while maintaining the temperature at about 20–25° C. A precipitate was formed, isolated by filtration, and washed free of acid. The precipitate was a pigment dye of bright orange color, insoluble in water, soluble, and giving a bright red solution which turns olive brown on dilution with water, in concentrated sulfuric acid. It can be used in the form of a paste or of a powder. It is represented by the formula:

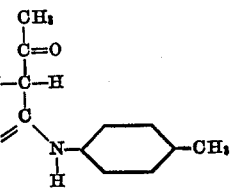

E. Many methods of varying the above process will occur to persons skilled in the art: Any method of diazotization can be used; any other satisfactory acid buffer can be substituted for sodium acetate, and any satisfactory acid can be used in place of hydrochloric acid. These suggested variations in the process are exemplary of many which can be made.

F. An advantage of the invention is the production of a bright orange pigment dye having good fastness to light, and being brighter, cleaner, and stronger than prior art pigment dyes of a similar nature. Another advantage is a satisfactory process of making the new dyes.

G. As many apparently widely different embodiments of this invention may be made without departing from the spirit and scope thereof, it is to be understood that we do not limit ourselves to the specific embodiments thereof except as defined in the appended claims.

We claim:

1. A composition of matter represented by the formula:

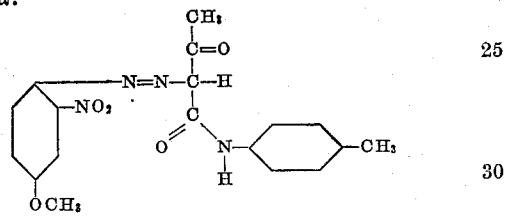

2. The method of making an azo pigment dye which comprises dissolving 21 parts of aceto-acet-para-toluidide in alkaline water, adding 20 parts of sodium acetate, acidifying, diazotizing 16.8 parts of 3-nitro-4-amino-anisole, mixing the solutions at a temperature of 20–25° C., filtering, and washing the filtrate free from acid.

3. The method of making an azo dyestuff which comprises dissolving aceto-acet-para-toiluidide in water, adding sodium acetate, acidifying, dissolving, and diazotizing 3-nitro-4-amino-anisole, and mixing the solutions at a temperature of 20–25° C.

4. The method of making an azo pigment dye which comprises diazotizing 3-nitro-4-amino-anisole and coupling it to aceto-acet-para-toluidide.

ARTHUR R. MURPHY.
CRAYTON K. BLACK.